US008766578B2

(12) United States Patent
Aghili

(10) Patent No.: US 8,766,578 B2
(45) Date of Patent: Jul. 1, 2014

(54) METHOD AND APPARATUS FOR HIGH VELOCITY RIPPLE SUPPRESSION OF BRUSHLESS DC MOTORS HAVING LIMITED DRIVE/AMPLIFIER BANDWIDTH

(75) Inventor: Farhad Aghili, Brossard (CA)

(73) Assignee: Canadian Space Agency, Saint-Hubert (CA)

( * ) Notice: Subject to any disclaimer, the term of this patent is extended or adjusted under 35 U.S.C. 154(b) by 235 days.

(21) Appl. No.: 13/405,575

(22) Filed: Feb. 27, 2012

(65) Prior Publication Data

US 2013/0221887 A1 Aug. 29, 2013

(51) Int. Cl.
*H02P 6/10* (2006.01)

(52) U.S. Cl.
USPC ...... 318/400.23; 318/432; 318/610; 318/632; 318/799; 700/280

(58) Field of Classification Search
USPC .................. 318/400.23, 432, 610, 632, 799; 700/280
See application file for complete search history.

(56) References Cited

U.S. PATENT DOCUMENTS

| 4,511,827 | A | 4/1985 | Morinaga et al. |
| 4,525,657 | A | 6/1985 | Nakase et al. |
| 4,546,294 | A | 10/1985 | Ban et al. |
| 4,658,190 | A | 4/1987 | Miyazaki et al. |
| 4,720,663 | A | 1/1988 | Welch et al. |
| 4,744,041 | A | 5/1988 | Strunk et al. |
| 4,855,652 | A | 8/1989 | Yamashita et al. |
| 4,912,379 | A | 3/1990 | Matsuda et al. |
| 5,057,753 | A | 10/1991 | Leuthold et al. |
| 5,191,269 | A | 3/1993 | Carbolante |
| 5,231,338 | A | 7/1993 | Bulgarelli et al. |
| 5,280,222 | A | 1/1994 | von der Heide et al. |
| 5,455,498 | A | 10/1995 | Kakimoto et al. |
| 5,469,215 | A * | 11/1995 | Nashiki .......................... 318/432 |
| 5,563,980 | A | 10/1996 | Chen et al. |
| 5,569,989 | A | 10/1996 | Acquaviva |

(Continued)

FOREIGN PATENT DOCUMENTS

| CN | 101552591 A | 10/2009 |
| CN | 101577517 A | 11/2009 |

(Continued)

OTHER PUBLICATIONS

Aghili, F. (2011). "Ripple suppression of BLDC motors with finite driver/amplifier bandwidth at high velocity." IEEE Transactions on Control Systems Technology. 19(2): 391-397.

(Continued)

*Primary Examiner* — Rita Leykin
(74) *Attorney, Agent, or Firm* — Perry + Currier Inc.

(57) ABSTRACT

A method and apparatus are provided for ripple suppression of brushless DC motors at any given velocity irrespective of the limited bandwidth of the driver/amplifier supplying the excitation currents to the stator. In a preferred embodiment, Fourier coefficients of the current waveform are calculated as a function of rotor velocity by taking into account the driver/amplifier's finite bandwidth dynamics. For a given velocity, Fourier coefficients of the series approximating the waveform (control signal) are calculated as a function of the rotor velocity and the amplifier dynamics, to generate a waveform that results in no torque or velocity pulsations. When changing the motor speed, the coefficients are updated (recalculated) based on the new desired velocity (and amplifier dynamics), resulting in generation of an updated waveform that results in no torque or velocity pulsations at the new motor speed.

10 Claims, 4 Drawing Sheets

(56) References Cited

U.S. PATENT DOCUMENTS

| | | |
|---|---|---|
| 5,625,264 A | 4/1997 | Yoon |
| 5,672,944 A | 9/1997 | Gokhale et al. |
| 5,757,152 A | 5/1998 | Yuem |
| 5,844,388 A | 12/1998 | Maiocchi |
| 5,888,242 A | 3/1999 | Antaki et al. |
| 6,049,187 A | 4/2000 | Haner |
| 6,144,132 A | 11/2000 | Nashiki |
| 6,313,601 B1 | 11/2001 | Kubo et al. |
| 6,331,757 B1 | 12/2001 | Makaran |
| 6,380,658 B1 | 4/2002 | Sebastian et al. |
| 6,415,206 B1 * | 7/2002 | Ventres ........................ 700/280 |
| 6,437,526 B1 | 8/2002 | Derouane et al. |
| 6,737,771 B2 | 5/2004 | Fujita et al. |
| 6,822,419 B2 | 11/2004 | Horng et al. |
| 6,828,748 B2 | 12/2004 | Horng et al. |
| 6,859,001 B2 | 2/2005 | Kane et al. |
| 6,922,038 B2 | 7/2005 | Horng et al. |
| 7,166,984 B1 | 1/2007 | Jones et al. |
| 7,375,488 B2 | 5/2008 | Jones |
| 7,629,764 B2 | 12/2009 | Shoemaker et al. |
| 7,715,698 B2 | 5/2010 | Bonner et al. |
| 7,852,025 B2 | 12/2010 | Crane |
| 7,859,209 B2 | 12/2010 | Iwaji et al. |
| 7,893,638 B2 | 2/2011 | Akama et al. |
| 7,906,930 B2 | 3/2011 | Takeuchi et al. |
| 7,952,308 B2 | 5/2011 | Schulz et al. |
| 7,969,108 B2 | 6/2011 | Vermeir |
| 7,994,744 B2 | 8/2011 | Chen |
| 2005/0017661 A1 | 1/2005 | Kane et al. |
| 2005/0035732 A1 | 2/2005 | Horng et al. |
| 2009/0128070 A1 | 5/2009 | Brown |
| 2009/0128078 A1 | 5/2009 | Chiu |
| 2010/0001670 A1 | 1/2010 | Scalese |
| 2010/0052584 A1 | 3/2010 | Bates et al. |
| 2010/0090633 A1 | 4/2010 | Deller et al. |
| 2010/0109458 A1 | 5/2010 | Hauser et al. |
| 2010/0117572 A1 | 5/2010 | Harada et al. |
| 2010/0134055 A1 | 6/2010 | Leong et al. |
| 2010/0134059 A1 | 6/2010 | Ha et al. |
| 2010/0148710 A1 | 6/2010 | Lim et al. |
| 2010/0156332 A1 | 6/2010 | Lin et al. |
| 2010/0171453 A1 | 7/2010 | Yasohara et al. |
| 2010/0176756 A1 | 7/2010 | Kawashima |
| 2010/0181947 A1 | 7/2010 | Hoogzaad |
| 2010/0237813 A1 | 9/2010 | Seki et al. |
| 2010/0237814 A1 | 9/2010 | Bi et al. |
| 2010/0237818 A1 | 9/2010 | Ohkubo et al. |
| 2010/0244755 A1 | 9/2010 | Kinugasa et al. |
| 2010/0264862 A1 | 10/2010 | Kitagawa |
| 2010/0270957 A1 | 10/2010 | Li et al. |
| 2010/0270960 A1 | 10/2010 | Larsson et al. |
| 2010/0314962 A1 | 12/2010 | Shiga |
| 2010/0315027 A1 | 12/2010 | Wystup et al. |
| 2011/0006712 A1 | 1/2011 | Weissbach et al. |
| 2011/0025237 A1 | 2/2011 | Wystup et al. |
| 2011/0031916 A1 | 2/2011 | Bonner et al. |
| 2011/0043144 A1 | 2/2011 | Ueda et al. |
| 2011/0043146 A1 | 2/2011 | Sato |
| 2011/0074324 A1 | 3/2011 | Iwaji et al. |
| 2011/0074325 A1 | 3/2011 | Crane |
| 2011/0074327 A1 | 3/2011 | Paintz et al. |
| 2011/0084639 A1 | 4/2011 | Brown |
| 2011/0115423 A1 | 5/2011 | Kern et al. |
| 2011/0121770 A1 | 5/2011 | Lai et al. |
| 2011/0133679 A1 | 6/2011 | Li et al. |
| 2011/0148336 A1 | 6/2011 | Hayashi |
| 2011/0156622 A1 | 6/2011 | Galbiati |
| 2011/0175556 A1 | 7/2011 | Tobari et al. |
| 2011/0176229 A1 | 7/2011 | Saito |
| 2011/0202941 A1 | 8/2011 | Lee et al. |
| 2011/0205662 A1 | 8/2011 | Bates et al. |
| 2011/0210688 A1 | 9/2011 | Dooley et al. |
| 2011/0218789 A1 * | 9/2011 | Van Beurden ................ 703/13 |
| 2012/0306411 A1 * | 12/2012 | Tadano .................... 318/400.02 |

FOREIGN PATENT DOCUMENTS

| | | |
|---|---|---|
| CN | 101694979 A | 4/2010 |
| CN | 101753073 A | 6/2010 |
| EP | 2228896 A1 | 9/2010 |
| FR | 2825203 A1 | 11/2002 |
| IT | BO20030505 A1 | 12/2004 |
| JP | 63171184 A | 7/1988 |
| JP | 6245582 A | 9/1994 |
| JP | 2001197765 A | 7/2001 |
| JP | 2001-238484 A | 8/2001 |
| JP | 2012211681 A | 8/2001 |
| JP | 2001352798 A | 12/2001 |
| JP | 2003274623 A | 9/2003 |
| JP | 2004015968 A | 1/2004 |
| JP | 2004336949 A | 11/2004 |
| JP | 2005027390 A | 1/2005 |
| JP | 2005027391 A | 1/2005 |
| JP | 2005192360 A | 7/2005 |
| JP | 2007-143237 A | 6/2007 |
| JP | 2007221955 A | 8/2007 |
| JP | 2008289322 A | 11/2008 |
| JP | 2009106069 A | 5/2009 |
| JP | 2009291071 A | 12/2009 |
| JP | 2010057218 A | 3/2010 |
| JP | 2011019336 A | 1/2011 |
| JP | 2011050118 A | 3/2011 |
| JP | 2011050119 A | 3/2011 |
| JP | 2011061910 A | 3/2011 |
| KR | 20000050410 A | 8/2000 |
| KR | 20040000622 A | 1/2004 |
| WO | 200060724 A1 | 10/2000 |
| WO | 200120767 A1 | 3/2001 |
| WO | 2008108292 A1 | 9/2008 |

OTHER PUBLICATIONS

Ahn, S.-Y., J.-W. Ahn and D.-H. Lee (2011). "A Novel Torque Controller Design for High Speed SRM using Negative Torque Compensator." 8th International Conference on Power Electronics—ECCE Asia, May 30-Jun. 3, 2011, Jeju, South Korea. 3039.

Bharatkar, S. S., R. Yanamshetti, D. Chatterjee and A. K. Ganguli (2011). "Dual-mode switching technique for reduction of commutation torque ripple of brushless dc motor." IET Electric Power Applications. 5(1): 193-202.

Heidari, R., G. A. Markadeh and S. Abazari (2011). "Direct torque and indirect flux control of brushless DC motor with non-sinusoidal back-EMF without position sensor." 2011 19th Iranian Conference on Electrical Engineering (ICEE), May 17-19, 2011.

Ozturk, S. B. and H. A. Toliyat (2011). "Direct torque and indirect flux control of brushless DC motor." IEEE/ASME Transactions on Mechatronics. 16(2): 351-360.

Rong, J. and Y. Li (2011). The technolgy study of a new kind of pulse width modulation mode for eliminating torque ripple. 2011 International Conference on Consumer Electronics, Communications and Networks, CECNet 2011—Proceedings. 2808-2811.

Tan, W., X. Li, H. Xiang, J. Zhu and C. Zhang (2011). "Research on compensation of torque ripple in servo system." Jixie Gongcheng Xuebao/Journal of Mechanical Engineering. 47(12): 1-6.

Yang, T., Q.-f. Li, S.-t. Wang and Z.-y. Lu (2011). Research on torque ripple suppression of position sensorless brushless DC motor during commutation. Power Electronics and ECCE Asia (ICPE & ECCE), 2011 IEEE 8th International Conference on, May 30-Jun. 3, 2011. 1148-1152.

Zhang, C., K. J. Tseng, Y. Xiao, G. Zhao and X. Yang (2011). "Optimized commutation strategy for high-speed single phase PM brushless DC motor." 2011 6th IEEE Conference on Industrial Electronics and Applications, Jun. 21-23, 2011, Beijing.

Bharatkar, S. S., R. Yanamsherti, D. Chatterjee and A. K. Ganguli (2010). "A modified switching technique for communication torque ripple reduction of a brushless DC motor drive." Modelling, Measurement and Control A. 83 (3-4): 24-47.

(56) References Cited

OTHER PUBLICATIONS

Bharatkar, S. S., R. Yanamshetti, D. Chatterjee and A. K. Ganguli (2010). Comparison of switching schemes for brushless DC motor drives. ECTI-CON 2010—The 2010 ECTI International Conference on Electrical Engineering/Electronics, Computer, Telecommunications and Information Technology. 1036-1040.
Boukais, B. and H. Zeroug (2010). "Magnet Segmentation for Commutation Torque Ripple Reduction in a Brushless DC Motor Drive." Magnetics, IEEE Transactions on. 46(11): 3909-3919.
Fu, C., Z. Li and M. Zhang (2010). The design of interior permanent magnet brushless motor control system based on finite element method. CAR 2010—2010 2nd International Asia Conference on Informatics in Control, Automation and Robotics. 130-133.
Haifeng, W., L. Pingping, L. Guohai and J. Hongping (2010). "Commutation torque ripple reduction in brushless DC motor based on double current regulators." Journal of Jiangsu University Natural Science Edition. 31(6): 691-694.
Kefsi, L., Y. Touzani and M. Gabsi (2010). Hybrid excitation synchronous motor control with a new flux weakening strategy. 2010 IEEE Vehicle Power and Propulsion Conference, VPPC 2010.
Kim, I., N. Nakazawa, S. Kim, C. Park and C. Yu (2010). "Compensation of torque ripple in high performance BLDC motor drives." Control Engineering Practice. 18(10): 1166-1172.
Li, J., H. H Zhang, Q. Wan and J. Liu (2010). A novel charging control for flywheel energy storage system based on BLDG motor. 2010 Asia-Pacific Power and Energy Engineering Conference, APPEEC 2010—Proceedings.
Wei, H., P. Li, G. Liu and H. Jia (2010). "Commutation torque ripple reduction in brushless DC motor based on double current regulators." Jiangsu Daxue Xuebao (Ziran Kexue Ban)/Journal of Jiangsu University (Natural Science Edition). 31(6): 691-694.
Yin, Z. and G. Liu (2010). "Research on Direct Torque Control for Brushless DC Motor." Micromotors. 2010(4). http://en.cnki.com.cn/Article_en/CJFDTOTAL-WDJZ201004018.htm.
Zhu, W., X. Yang and Z. Lan (2010). Structure optimization design of high-speed BLDC motor using Taguchi method. Proceedings—International Conference on Electrical and Control Engineering, ICECE 2010. 4247-4249.
Huang, Y., H. Wu, H. Ji and B. Kou (2009). "Research and Development on the High speed Brushless DC Motor Controller [J]." Micromotors. 2009(10). http://en.cnki.com.cn/Article_en/CJFDTOTAL-WDJZ200910005.htm.
Le, Z., Z. Bo and C. Fang-Shun (2009). Analysis and Suppression of Torque Ripple for Doubly Salient Electro-Magnetic Motor. Industry Applications Society Annual Meeting, 2009. IAS 2009. IEEE, Oct. 4-8, 2009. 1-6.
Li, L. (2009). Study on Torque Ripple Attenuation for BLDCM Based on Vector Control Method. 2009.
Meng, G., H. Xiong and H. Li (2009). Commutation torque ripple reduction in BLDC motor using PWM-ON-PWM mode. Proceedings—The 12th International Conference on Electrical Machines and Systems, ICEMS 2009.
Yaya, S. and H. Wang (2009). Research on Reduction of Commutation Torque Ripple in Brushless DC Motor Drives Based on Fuzzy Logic Control. Computational Intelligence and Security, 2009. CIS '09. International Conference on, Dec. 11-14, 2009. 240-243.
Adam, A. A. and K. Gulez (2008). "Fast response adaptive fuzzy logic controller for sensorless direct torque control of PMSM with minimum torque ripple." COMPEL—The International Journal for Computation and Mathematics in Electrical and Electronic Engineering. 27(2): 534-550.
Aghili, F. (2008). "Adaptive Reshaping of Excitation Currents for Accurate Torque Control of Brushless Motors." Control Systems Technology, IEEE Transactions on. 16(2): 356-364.
Bharatkar, S. S., R. Yanamshetti, D. Chatterjee and A. K. Ganguli (2008). Commutation torque ripple analysis and reduction through hybrid switching for BLDC motor drives. IEEE Region 10 Colloquium and 3rd International Conference on Industrial and Information Systems, ICIIS 2008.

Bharatkar, S. S., R. Yanamshetti, D. Chatterjee and A. K. Ganguli (2008). Reduction of commutation torque ripple in a brushless DC motor drive. PECon 2008—2008 IEEE 2nd International Power and Energy Conference. 289-294.
Chunmei, Z., L. Heping, C. Shujin and W. Fangjun (2008). "Application of neural networks for permanent magnet synchronous motor direct torque control* * This project was partially supported by the National Natural Science Foundation of China (60374032)." Journal of Systems Engineering and Electronics. 19(3): 555-561.
Gulez, K. (2008). "Adaptive neural network based controller for direct torque control of PMSM with minimum torque ripples and EMI noise reduction." COMPEL—The International Journal for Computation and Mathematics in Electrical and Electronic Engineering. 27(6): 1387-1401.
Huang, Y., X. Jiang and A. Qiu (2008). "Energy feedback control for flywheel energy storage system." Qinghua Daxue Xuebao/Journal of Tsinghua University. 48(7): 1085-1088.
Ozturk, S. B. and H. A. Toliyat (2008). Sensorless direct torque and indirect flux control of brushless DC motor with non-sinusoidal back-EMF. Proceedings—34th Annual Conference of the IEEE Industrial Electronics Society, IECON 2008. 1373-1378.
Wei, C., X. Changliang and X. Mei (2008). A torque ripple suppression circuit for brushless DC motors based on power DC/DC converters. Industrial Electronics and Applications, 2008. ICIEA 2008. 3rd IEEE Conference on, Jun. 3-5, 2008. 1453-1457.
Aghili, F. (2007). Torque control of electric motors without using torque sensor. Intelligent Robots and Systems, 2007. IROS 2007. IEEE/RSJ International Conference on, Oct. 29-Nov. 2, 2007. 3604-3609.
Liu, Y., Z. Q. Zhu and D. Howe (2007). "Commutation-torque-ripple minimization in direct-torque-controlled PM brushless DC drives." IEEE Transactions on Industry Applications. 43(4): 1012-1021.
Zhou, J. and Y. Hou (2007). "The review on torque ripple minimization of brushless DC motors [J]." Machine Tool Electric Apparatus. 2007(6). http://en.cnki.com.cn/Article_en/CJFDTOTAL-JCDQ200706002.htm.
Chunmei, Z., M. Baozhu, L. Heping and C. Shujin (2006). A new approach to direct torque control of interior permanent magnet synchronous motor. 1st International Symposium on Systems and Control in Aerospace and Astronautics. 912-915.
Halvaei Niasar, A., H. Moghbelli and A. Vahedi (2006). Commutation torque ripple of four-switch, brushless DC motor drives, part II: Controllability and minimization. International Workshop on Advanced Motion Control, AMC. 547-552.
Kioumarsi, A., M. Moallem and B. Fahimi (2006). "Mitigation of torque ripple in interior permanent magnet motors by optimal shape design." IEEE Transactions on Magnetics. 42(11): 3706-11.
Lin, P., K. Wei and Z. C. Zhang (2006). "Novel control scheme to suppress the commutation torque ripple in BLDCM." Zhongguo Dianji Gongcheng Xuebao/Proceedings of the Chinese Society of Electrical Engineering. 26(3): 153-158.
Liu, Y., Z. Q. Zhu and D. Howe (2006). Commutation torque ripple minimization in direct torque controlled PM brushless DC drives. Conference Record—IAS Annual Meeting (IEEE Industry Applications Society). 1642-1648.
Oh, T.-S., N.-E. Her and I.-H. Kim (2006). "Commutation time control for torque ripple reduction of BLDC motors." Transactions of the Korean Institute of Electrical Engineers, D. 55(8): 363-8.
Yang, B. Y., H. K. Park and B. I. Kwon (2006). Design of flux barrier for reducing torque ripple and cogging Torque in IPM type BLDC motor. 12th Biennial IEEE Conference on Electromagnetic Field Computation, CEFC 2006.
Zhang, C., B. Ma, H. Liu and S. Chen (2006). Neural networks implementation of direct torque control of permanent magnet synchronous motor. IMACS Multiconference on "Computational Engineering in Systems Applications", CESA. 1839-1843.
Zhang, X. and Z. Lu (2006). A New BLDC Motor Drives Method Based on BUCK Converter for Torque Ripple Reduction. Power Electronics and Motion Control Conference, 2006. IPEMC 2006. CES/IEEE 5th International, Aug. 14-16, 2006. 1-4.
Zolotukhin, Y. N. and A. A. Nesterov (2006). "Field parameter identification to suppress torque ripples in permanent magnet synchronous motors." Avtometriya. 42(2): 4-8.

(56) References Cited

OTHER PUBLICATIONS

Wei, K., C. Hu, Z. Zhang and Z. Lu (2005). A Novel Commutation Torque Ripple Suppression Scheme in BLDCM by Sensing the DC Current. Power Electronics Specialists Conference, 2005. PESC '05. IEEE 36th, Jun. 16-16, 2005. 1259-1263.

Zhang, L. and W. Qu (2005). Commutation torque ripple restraint in BLDC motor over whole speed range. ICEMS 2005: Proceedings of the Eighth International Conference on Electrical Machines and Systems. 1501-1506.

N'Diaye, A., C. Espanet and A. Miraoui (2004). Reduction of the torque ripples in brushless PM motors by optimization of the supply—theoretical method and experimental implementation. Industrial Electronics, 2004 IEEE International Symposium on, May 4-7, 2004. 1345-1350 vol. 2.

Song, J. H. and I. Choy (2004). "Commutation torque ripple reduction in brushless DC motor drives using a single DC current sensor." IEEE Transactions on Power Electronics. 19(2): 312-319.

Chang-hee, W., S. Joong-ho and I. Choy (2002). Commutation torque ripple reduction in brushless DC motor drives using a single DC current sensor. Power Electronics Specialists Conference, 2002. pesc 02. 2002 IEEE 33rd Annual, 2002. 985-990 vol. 2.

Won, C. H., J. H. Song and I. Choy (2002). Commutation torque ripple reduction in brushless DC motor drives using a single DC current sensor. Pesc Record—IEEE Annual Power Electronics Specialists Conference. 985-990.

Yoshida, M., Y. Murai and M. Takada (1998). Noise reduction by torque ripple suppression in brushless DC motor. Power Electronics Specialists Conference, 1998. PESC 98 Record. 29th Annual IEEE, May 17-22, 1998. 1397-1401 vol. 2.

\* cited by examiner

METHOD AND APPARATUS FOR HIGH VELOCITY RIPPLE SUPPRESSION OF BRUSHLESS DC MOTORS HAVING LIMITED DRIVE/AMPLIFIER BANDWIDTH

BACKGROUND OF THE INVENTION

1. Field of the Invention

The present invention is directed to brushless DC motors, and more particularly to a method and apparatus for ripple suppression in brushless DC motors having limited drive/amplifier bandwidth when operated at high velocity.

2. Description of the Related Art

Brushless DC (BLDC) motors, or electronically commutated motors (ECMs, EC motors) are electric motors that are powered by direct-current (DC) electricity via electronic commutation systems. BLDC motors exhibit linear current-to-torque and frequency-to-speed relationships and are commonly used as servo drives for precision motion control in numerous applications ranging from silicon wafer manufacturing, medical, robotics and automation industries to military applications.

BLDC motors comprise a rotor having a plurality of permanent magnets, a stator with electromagnetic coil armature windings, and a commutator for continually switching the phase of the current in the armature windings to induce motion in the rotor. More particularly, an electronic controller causes the commutator to apply excitation current to the armature windings in a specific order in order to rotate the magnetic field generated by the windings thereby causing the rotor magnets to be pulled into alignment with the moving magnetic fields and thereby drive rotation of the rotor.

Prior art relating generally to the construction of BLDC motors and controllers therefor, includes: U.S. Pat. Nos. 6,144,132; 7,715,698; 7,852,025; 7,906,930; US 2010/0109458; US 2010/01487101; US 2010/0176756; US 2010/0181947; US 2010/0270957; US 2010/0314962; US 2011/0031916; US 2011/0074325; US 2011/0133679. The following patent documents are directed to methods of controlling speed (velocity) of BLDC motors: U.S. Pat. Nos. 4,720,663; 4,855,652; 5,563,980; 5,757,152; 6,049,187; 6,313,601; 6,822,419; 6,828,748; 6,922,038; 7,375,488; 7,994,744; US 2005/0035732; US 2009/0128078; US 2010/0001670; US 2010/0134055; US 2010/0171453.

In order to control the speed of rotor rotation, the electronic controller requires information relating to the rotor's orientation/position (relative to the armature windings). The following patent documents are directed to methods of commutating and controlling BLDC motors relying on feedback of the sensed rotor position: US 2010/0117572; US 2010/0134059; US 2010/0237818; US 2010/0264862; US 2010/0270960; US 2011/0043146; US 2011/0176229.

Some electronic controllers use Hall Effect sensors or rotary encoders to directly measure the rotor position. Other controllers measure the back EMF in the windings to infer the rotor position. The following patent documents disclose methods of commutating and controlling BLDC motors relying on feedback of sensed back electromotive force (back EMF): U.S. Pat. Nos. 5,057,753; 5,231,338; US 2011/0074327; US 2011/0115423; US 2011/0121770; US 2011/0156622; US 2011/0210688. Additional background patent literature relevant to commutating BLDC motors using feedback includes: U.S. Pat. Nos. 7,893,638; 7,969,108; US 2010/0052584; US 2010/0090633; US 2010/0237813; US 2010/0237814; US 2010/0315027; US 201110006712; US 201110025237; US 201110043144; US 201110084639; US 201110148336; US 201110202941; US 201110205662.

Typically, the excitation current generated by the commutator has insufficient power to be fed directly to the coils, and must be amplified to an appropriate power level by a driver/amplifier. The conventional driver/amplifier of a BLDC motor produces sinusoidal armature current waveforms to the armature windings for smooth motor operation. However, in practice, the actual magneto-motive force generated by a non-ideal motor is not perfectly sinusoidally distributed, and can therefore result in 'torque ripple'. It is known that suppressing torque ripple in the motor drive of a servo system can significantly improve system performance by reducing speed fluctuations (see Park, S. J., Park, H. W., Lee, M. H. and Harashima, F.: *A new approach for minimum-torque-ripple maximum-efficiency control of BLDC motor*, IEEE Trans. on Industrial Electronics 47(1), 109-114 (2000); and Aghili, F., Buehler, M. and Hollerbach, J. M.: *Experimental characterization and quadratic programming-based control of brushless-motors*, IEEE Trans. on Control Systems Technology 11(1),139-146 (2003) [hereinafter Aghili et al., 2003].

One known solution to reducing torque ripple in commercial high-performance electric motors is to increase the number of motor poles. However, such motors tend to be expensive and bulky due to the construction and assembly of multiple coil windings.

Other control approaches for accurate torque control in electric motors, and their underlying models, are set forth in the patent literature. For example, the following patent documents are directed to various methods and systems for stabilizing or reducing torque ripple in synchronous electric motors, particularly BLDC motors: U.S. Pat. Nos. 4,511,827; 4,525,657; 4,546,294; 4,658,190; 4,912,379; 5,191,269; 5,569,989; 5,625,264; 5,672,944; 6,437,526; 6,737,771; 6,859,001; 7,166,984; 7,859,209; 7,952,308; US 201110175556.

Additional prior art approaches for providing accurate torque production in electric motors are set forth in the non-patent literature.

For example, Le-Huy, H., Perret, R. and Feuillet, R.: Minimization of torque ripple in brushless dc motor drives, IEEE Trans. Industry Applications 22(4), 748-755 (1986), and Favre, E., Cardoletti, L. and Jufer, M.: 1993, Permanent-magnet synchronous motors: A comprehensive approach to cogging torque suppression, IEEE Trans. Industry Applications 29(6), 1141-1149, describe a method of reducing the torque-ripple harmonics for brushless motors by using several current waveforms.

Ha and Kang: *Explicit characterization of all feedback linearizing controllers for a general type of brushless dc motor*, IEEE Trans. Automatic Control 39(3), 673-6771994 (1994) characterize, in an explicit form, the class of feedback controllers that produce ripple-free torque in brushless motors.

Newman, W. S. and Patel, J. J.: *Experiments in torque control of the AdeptOne robot*, Sacramento, Calif., pp. 1867-1872 (1991) discuss the use of a 2-D lookup table and a multivariate function to determine the phase currents of a variable-reluctance motor with respect to position and torque set points.

Optimal torque control schemes for reducing torque ripples and minimizing copper losses in BLDC motors have been proposed (see Hung, Y and Ding, Z.: *Design of currents to reduce torque ripple in brushless permanent magnet motors*, IEEE Proc. Pt. B 140(4) (1993) [hereinafter Hung-Ding 1993]; Aghili, F., Buehler, M. and Hollerbach, J. M.: *Optimal commutation laws in the frequency domain for PM synchronous direct-drive motors*, IEEE Transactions on Power Electronics 15(6), 1056-1064 (2000) [hereinafter Aghili et al., 2000]; Park, S. J., Park, H. W., Lee, M. H. and Harashima, F.: *A new approach for minimum-torque-ripple maximum-efficiency control of BLDC motor*, IEEE Trans. on Industrial Electronics 47(1), 109-114 (2000); as well as Aghili et al., 2003, above.

Wang, J., Liu, H., Zhu, Y., Cui, B. and Duan, H.: 2006, *A new minimum torque-ripple and sensorless control scheme of bldc motors based on rbf networks*, IEEE Int. Conf. on Power Electronics and Motion Control, Shanghai, China, pp. 1-4 (2006), proposes a method for minimizing the torque ripples generated by non-ideal current waveforms in a BLDC motor having no position sensors, by adjusting actual phase currents.

Similarly, the electrical rotor position can be estimated using winding inductance, and the stationary reference frame stator flux linkages and currents can be used for a sensorless torque control method using d-axis current, as set forth in Ozturk, S. and Toliyat, H. A.: *Sensorless direct torque and indirect flux control of brushless dc motor with non-sinusoidal back-EMF*, IEEE Annual Conf. on Industrial Electronics IECON, Orlando, Fla., pp. 1373-1378 (2008).

Lu, H., Zhang, L. and Qu, W., *A new torque control method for torque ripple minimization of BLDC motors with un-ideal back EMF*, IEEE Trans. on Power Electronics 23(2), 950-958 (2008), sets forth a torque control method to attenuate torque ripple of BLDC motors with non-ideal back electromotive force (EMF) waveforms, wherein the influence of finite dc bus supply voltage is considered in the commutation period.

A low cost BLDC drive system is set forth in Feipeng, X., Tiecai, L. and Pinghua, T.: *A low cost drive strategy for BLDC motor with low torque ripples*, IEEE Int. Conf. on Industrial Electronics and Applications, Singapore, pp. 2499-2502 (2008), wherein only a current sensor and proportional-integral-derivative controller (PID controller) are used to minimize the pulsating torque.

In the prior art set forth above, it is assumed that the phase currents can be controlled accurately and instantaneously and that they may therefore be treated as control inputs, such that the waveforms of the motor phase currents may be adequately pre-shaped so that the generated torque is equal to the requested torque. However, at high rotor velocity the commutator generates high frequency control signals that the finite bandwidth motor dynamics of the driver/amplifier may not be able to respond sufficiently quickly. Thus, complete compensation for the position nonlinearity of the motor torque cannot be achieved in the presence of amplifier dynamics, with the result that pulsation torque therefore appears at high motor velocities. As discussed above, torque ripple can significantly deteriorate the performance of the servo control system and even lead to instability if the ripple frequency is close to the modal frequency of the closed-loop system.

In Aghili et al., 2000, above, an optimal commutation scheme is set forth based on Fourier coefficients in BLDC motors. This was followed by Aghili, F.: *Adaptive reshaping of excitation currents for accurate torque control of brushless motors*, IEEE Trans. on Control System Technologies 16(2), 356-364 (2008), which developed a self-tuning adaptive version of the commutation law that estimates the Fourier coefficients of the waveform associated with the motor's electromotive force based on measurements of motor phase voltage and angle.

Other prior art has addressed the application of Fourier analysis to BDLC motor control. For example, U.S. Pat. No. 6,380,658 discloses a method and apparatus for torque ripple reduction in a sinusoidally excited brushless permanent magnet motor for automotive applications (for electric power steering, as an alternative to hydraulic power steering). In essence, the physical components of the BLDC motor are designed to a predetermined geometry for reducing torque ripple when the motor is sinusoidally excited (i.e. driven by a sinusoidal current supplied to its armature coils). More specifically, the method of the '658 patent applies an elementary Fourier analysis to determine one specific dimension of the rotor of a given shape which minimizes the fifth harmonic component of the magnetic flux in the air gap between the stator and the rotor, when the motor is driven by a sinusoidal current. The fifth harmonic is identified as the lowest harmonic having adverse influence on torque ripple and therefore the one that should be eliminated to the extent possible.

U.S. Pat. No. 7,629,764 discloses a method of controlling a high-speed servomotor, such as a BLDC motor, operating under control of a PWM (pulse-width modulation) controller, to attain optimal performance and stability margins across an operational range encompassing the entire torque versus speed curve of the motor. According to the '764 patent, the torque versus speed curve for the motor is divided into operating regions, and control parameters are calculated for each region. Fourier analysis (transforms) of various feedback signals received from the operating motor (e.g., the electric current flowing through the motor and its actual speed) is carried out in real time to produce fundamental and harmonic components of the feedback signals, which components are then used to produce an output voltage command for controlling the motor.

Additional patent literature is directed to methods and systems for controlling and/or operating electric motors using Fourier transforms of signals, including: FR 2,825,203; JP 2001238,484; JP 2007143,237; U.S. Pat. Nos. 4,7440,41; 5,280,222; 5,455,498; 5,844,388. The foregoing patent references disclose various methods for controlling or commutating electric motors, in particular BLDC motors, using the results of Fourier transforms of various periodic signals, feedback or otherwise.

Additional non-patent literature relevant to this disclosure includes:

Murai, Y, Kawase, Y, Ohashi, K., Nagatake, K. and Okuyama, K.: 1989, *Torque ripple improvement for brushless dc miniature motors*, Industry Applications, IEEE Transactions on 25(3), 441-450;

Delecluse, C. and Grenier, D.: 1998, *A measurement method of the exact variations of the self and mutual inductances of a buried permanent magnet synchronous motor and its application to the reduction of torque ripples*, 5th International Workshop on Advanced Motion Control, Coimbra, pp. 191-197;

Wallace, R. S. and Taylor, D. G.: 1991, *Low-torque-ripple switched reluctance motors for direct-drive robotics*, IEEE Trans. Robotics & Automation 7(6), 733-742;

Filicori, E, Bianco, C. G. 1. and Tonielli, A.: 1993, *Modeling and control strategies for a variable reluctance direct-drive motor*, IEEE Trans. Industrial Electronics 40(1), 105115;

Matsui, N., Makino, T. and Satoh, H.: 1993, *Autocompensation of torque ripple of direct drive motor by torque observer*, IEEE Trans. on Industry Application 29(1), 187-194;

Taylor, D. G.: 1994, *Nonlinear control of electric machines: An overview*, IEEE Control Systems Magazine 14(6), 41-51;

Kang, J.-K. and Sui, S.-K.: 1999, *New direct torque control of induction motor for minimum torque ripple and constant switching frequency*, IEEE Trans. on Industry Applications 35(5), 1076-1082.;

French, G. and Acamley, P.: 1996, *Direct torque control of permanent magnet drives*, IEEE Trans. on Industry Applications 32(5), 1080-1088;

Kang, J.-K. and Sui, S.-K.: 1999, *New direct torque control of induction motor for minimum torque ripple and constant switching frequency*, IEEE Trans. on Industry Applications 35(5), 1076-1082;

Xu, Z. and Rahman, M. F.: 2004, *A variable structure torque and flux controller for a DTC IPM synchronous motor drive*, IEEE 35th Annual Power Electronics Specialists Conference, PESC04., pp. 445-450, Vol. 1).

SUMMARY OF THE INVENTION

According to the invention a method and apparatus are provided for ripple suppression of brushless DC motors at any given velocity irrespective of the limited bandwidth of the driver/amplifier supplying the excitation currents to the armature. In a preferred embodiment, Fourier coefficients of the current waveform are calculated as a function of rotor velocity by taking into account the driver/amplifier's finite bandwidth dynamics in order to eliminate pulsation torque. Unlike Aghili et al., 2000, above, the inventive commutation scheme updates the Fourier coefficients of the current waveform based on the desired velocity so that the torque ripple and velocity fluctuation are eliminated for a given velocity while power losses are simultaneously minimized. More particularly, since the control signal is a periodic function (i.e. a waveform), it can be approximated by a truncated (finite) Fourier series. For a given velocity, Fourier coefficients of the series approximating the waveform (control signal) are calculated as a function of the rotor velocity and the amplifier dynamics, to generate a waveform that results in no torque or velocity pulsations. When changing the motor speed, the coefficients are updated (recalculated) based on the new desired velocity (and amplifier dynamics), resulting in generation of an updated waveform that results in no torque or velocity pulsations at the new motor speed.

The above aspects can be attained by a method and apparatus of driving a load via a brushless DC motor, the method comprising: receiving a desired motor velocity $\omega_d$; receiving actual velocity $\omega$ and rotor position angle $\theta$ from said load; generating armature phase drive currents $i^*_k$ for a desired torque $\tau_d$ from the desired motor velocity $\omega_d$, actual velocity $\omega$ and rotor position angle $\theta$ using a modified commutation law; amplifying the armature phase drive currents via a driver/amplifier; and applying the amplified armature phase drive currents $i_k$ to an armature of said brushless DC motor for rotating said load; wherein the modified commutation law comprises calculating compensated Fourier coefficients c' of a truncated (finite) Fourier series approximating the armature phase drive currents for said desired motor velocity $\omega_d$ as a function of the actual velocity $\omega$ and transfer function of said driver/amplifier.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
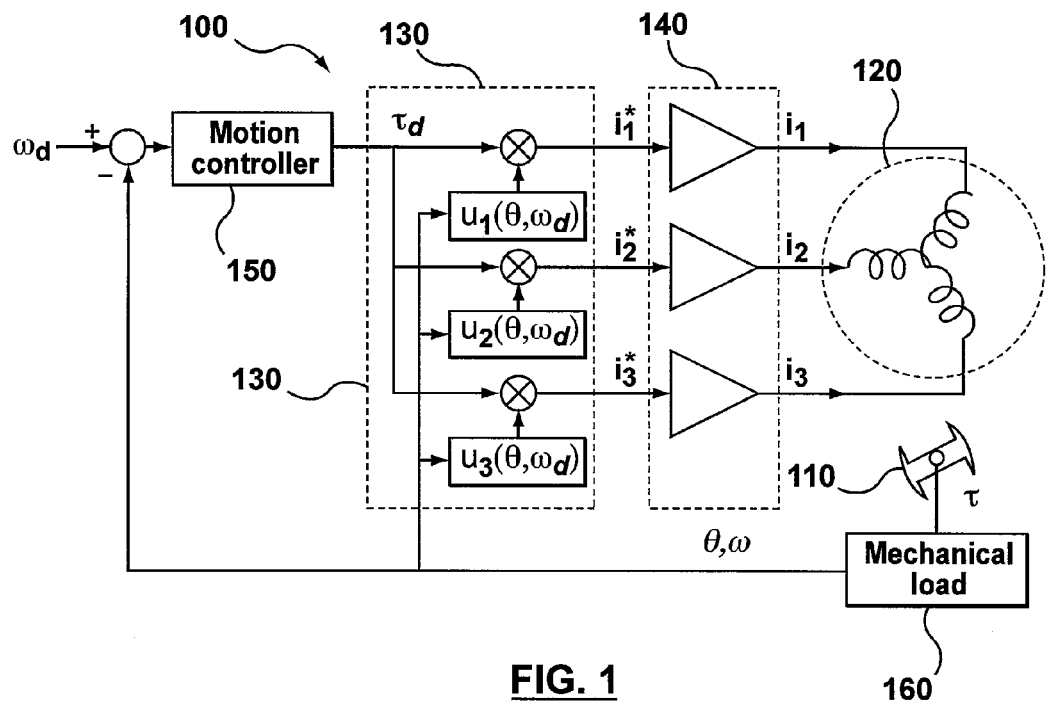
FIG. 1 is a block diagram of a brushless DC motor according to a preferred embodiment of the invention.

Turning to FIG. 1, a BLDC motor 100 is illustrated, comprising a rotor 110 having a plurality of permanent magnets (not shown) for driving a mechanical load 160, a stator 120 with electromagnetic coil armature windings, and a controller for controlling rotation of the rotor 110, including a commutator 130 for generating drive current ($i^*_1$, $i^*_2$, $i^*_3$) which is then amplified via driver/amplifier 140 ($i_1$, $i_2$, $i_3$) and applied to the stator 120 in a specific order, and a motion controller 150 for pre-shaping the current waveform on the basis of an input signal representing a desired motor velocity $\omega_d$. The actual velocity w and rotor position angle $\theta$ are fed back from the mechanical load 160 driven by the rotor 110.

In order to better understand the scientific principles behind the invention, the theory relating to modeling and control of motor torque is discussed below in terms of Fourier series, followed by a discussion of how the commutation law is modified at high velocity for ripple compensation and derivation of the torque transfer function, taking into account the dynamics of the driver/amplifier 140.

Consider the BLDC motor 100 with p phases (in FIG. 1, p=3), and assume that there is negligible cross-coupling between the phase torques and no reluctance torque. Then, the torque developed by a single phase is a function of the phase current $i_k$ and the rotor position angle $\theta$, as follows:

$$\tau_k(i_k, \theta) = i_k y_k(\theta) \quad k=1, \ldots, p \qquad (1)$$

Where $y_k(\theta)$ is the position nonlinearity, or torque shape function, associated with the kth phase. The motor torque $\tau$ is the superposition of all phase torque contributions, $$\tau = \sum_{k=1}^{p} i_k(\theta, \tau_d) y_k(\theta). \qquad (2)$$

The torque control problem requires solving equation (2) in terms of current, $i_k(\theta, \tau_d)$, as a function of motor position, given a desired motor torque $\tau_d$. For any scalar torque set point, equation (2) permits infinitely many (position dependent) phase current wave forms. Since the continuous mechanical power output of an electrical motor is limited primarily by heat generated from internal copper losses, the freedom in the phase current solutions may be used to minimize power losses, $$P_{loss} \propto i^T i, \qquad (3)$$

where i=col ($i_1, \ldots i_p$) is the vector of phase currents.

In rotary electric motors, the torque shape function is a periodic function. Since successive phase windings are shifted by $2\pi/p$, the following relationship exists, $$y_k(\theta) = y\left(q\theta + \frac{2\pi(k-1)}{p}\right), \forall k = 1, \ldots, p \quad (4)$$

where q is the number of motor poles. The electronic commutator 130 commands the phase currents $i^*_k$ through $$i^*_k(\tau_d, \theta) = \tau_d u_k(\theta), \forall k = 1, \ldots, p \quad (5)$$

where $u_k(\theta)$ is the commutation shape function associated with the kth phase. The individual phase control signals can be expressed based on the periodic commutation function, $u(\theta)$ which is also a periodic function, i.e., $$u_k(\theta) = u\left(q\theta + \frac{2\pi(k-1)}{p}\right),$$

Since both the commutation shape function $u(\theta)$ and the torque shape function $y(\theta)$ are periodic functions with position periodicity of $2\pi/q$, they can be approximated effectively via the truncated complex Fourier series $$u(\theta) = \sum_{n=-N}^{N} c_n e^{jnq\theta}, \quad (6)$$

$$y(\theta) = \sum_{m=-N}^{N} d_m e^{jmq\theta}, \quad (7)$$

where $j=\sqrt{-1}$ and N can be chosen arbitrary large, but $2N/p$ must be an integer. Since both are real valued functions, their negative Fourier coefficients are the conjugate of their real ones, $c_{-n} = \bar{c}_n$ and $d_{-n} = \bar{d}_n$. Furthermore, since the magnetic force is a conservative field for linear magnetic systems, the average torque over a period must be zero, and thus $c_0 = 0$.

The motor model and its control can be described by the vectors c, d $\in C^N$ of the Fourier coefficients of $u(\theta)$ and $y(\theta)$, respectively, by $$c = \text{col}(c_1, c_2, \ldots, c_N), \quad (8)$$

$$d = \text{col}(d_1, d_2, \ldots, d_N). \quad (9)$$

In the following, coefficient c may be determined for a given torque spectrum vector d so that the motor torque $\tau$ becomes ripple free, i.e. independent of the motor angle $\theta$. It may be assumed that the driver/amplifier 140 delivers the demanded current instantaneously, i.e., $i_k = i^*_k$ for $k=1, \ldots, p$. In this case, after substituting equations (4)-(1) into (2), we arrive at $$\tau = \tau_d \sum_{k=1}^{p} \sum_{\substack{n=-N \\ n \neq 0}}^{N} \sum_{\substack{m=-N \\ m \neq 0}}^{N} c_n d_m e^{j(n+m)\left(q\theta + \frac{2\pi(k-1)}{p}\right)}. \quad (10)$$

This expression can be simplified by noting that the first summation vanishes when $l=m+n$ is not a multiple of p, i.e., $$\sum_{k=1}^{p} e^{jl\frac{2\pi(k-1)}{p}} = \begin{cases} p & \text{if } l = \pm p, \pm 2p, \pm 3p, \ldots \\ 0 & \text{otherwise.} \end{cases} \quad (11)$$

Defining $\rho := pq$, the torque expression (10) can be written in the following compact form $$\tau = \tau_d p \sum_{\substack{m=-N \\ m \neq 0}}^{N} \sum_{n=\lfloor(-N+m)/p\rfloor}^{\lfloor(N+m)/p\rfloor} d_m c_n e^{-jqm\theta} e^{j\rho n\theta} \quad (12)$$

The expression of the torque in (12) can be divided into two parts: The position dependent torque, $\tau_{rip}(\theta,\tau_d)$, and the position independent torque, $\tau_{lin}(\tau_d)$. That is $$\tau = \tau_{lin}(\tau_d) + \tau_{rip}(\theta, \tau_d), \quad (13)$$

in which $$\tau_{lin}(\tau_d) = \tau_d k_0 \quad (14)$$

$$\tau_{rip}(\theta, \tau_d) = \tau_d \sum_{\substack{l=-2N/p \\ l \neq 0}}^{2N/p} k_l e^{j\rho l\theta}, \quad (15)$$

where $k_l$ are the Fourier coefficients of the motor torque, and can be calculated by $$k_l = \begin{cases} p \sum_{n=1}^{N} c_n \bar{d}_{n-pl} + p \sum_{n=1}^{N-pl} \bar{c}_n d_{n+pl} & \text{if } l < \frac{N}{p} \\ p \sum_{n=pl-N}^{pl-1} c_n d_{pl-n} & \text{otherwise.} \end{cases} \quad (16)$$

The term $k_0$ in (14) is the constant part of the circular convolution of $u(\theta)$ and $y(\theta)$. This, in turn, is equal to twice the real part of the inner product of the vectors c and d, $$k_0 = 2p\text{Re}\langle c, d\rangle. \quad (17)$$

A ripple-free torque implies that all coefficients $k_l$ except $k_0$ are zero and $k_0 \equiv 1$ so that $\tau \equiv \tau_d$. That is, the spectrum of the current excitation, c, must be calculated so that $$k_n = \begin{cases} 1 & \text{if } n = 0 \\ 0 & \text{otherwise} \end{cases}$$

This problem has infinitely many solutions. In this case, it is possible to minimize the power dissipation by noting that the average of dissipated power per unit command torque over one period, assuming constant speed, is $$P_{loss} \propto \frac{1}{T} \int_0^T \|i(t)\|^2 dt$$

By changing the integral variable from time t to θ, where dθ=ωdt and ωT=2π/q, we have $$P_{loss} \propto \frac{q}{2\pi} \sum_{k=1}^{P} \int_{0}^{2\pi/q} u_k^2(\theta) d\theta, \quad (18)$$

where $\tau_d \equiv 1$. By virtue of Parseval's theorem, the power loss per unit commanded torque, i.e. $\tau_d=1$, is $$P_{loss} \propto p\|c\|^2 \quad (19)$$

A person of skill in the art will understand that minimizing power loss is tantamount to minimizing the Euclidean norm of the commutation spectrum vector $\|c\|$.

Where the spectrum of the excitation current $c \in C^N$ represents the set of unknown variables then, according to (16), in order to minimize power loss, we must solve $$\min \|c\|^2 \quad (20)$$

$$\text{subject to: } Ac + B\bar{c} - \zeta = 0, \quad (21)$$

where $$\zeta \triangleq col\left(\frac{1}{p}, 0, \ldots, 0\right) \in \mathbb{R}^{2N/p+1}, \text{ and matrices } A, B \in C^{(2\frac{N}{p}+1) \times N}$$

can be constructed from the torque spectrum vector. For example, for a three phase motor (p=3), the A and B matrices are given as $$A = \begin{bmatrix} \bar{d}_1 & \bar{d}_2 & \bar{d}_3 & \bar{d}_4 & \bar{d}_5 & \ldots & \bar{d}_{N-1} & \bar{d}_N \\ d_2 & d_1 & 0 & \bar{d}_1 & \bar{d}_2 & \ldots & \bar{d}_{N-4} & \bar{d}_{N-3} \\ d_5 & d_4 & d_3 & d_2 & d_1 & \ldots & \bar{d}_{N-7} & \bar{d}_{N-6} \\ \vdots & \vdots & \vdots & \vdots & \vdots & \vdots & \vdots & \vdots \\ d_{N-1} & d_{N-2} & d_{N-3} & d_{N-4} & d_{N-5} & \ldots & d_1 & 0 \\ 0 & 0 & d_N & d_{N-1} & d_{N-2} & \ldots & d_4 & d_3 \\ \vdots & \vdots & \vdots & \vdots & \vdots & \vdots & \vdots & \vdots \\ 0 & 0 & 0 & 0 & 0 & \ldots & 0 & d_N \end{bmatrix} \quad (22)$$

$$B = \begin{bmatrix} d_1 & d_2 & d_3 & d_4 & d_5 & \ldots & d_N \\ d_4 & d_5 & d_6 & d_7 & d_8 & \ldots & 0 \\ d_7 & d_8 & d_9 & d_{10} & d_{11} & \ldots & 0 \\ \vdots & \vdots & \vdots & \vdots & \vdots & \vdots & \vdots \\ d_{N-2} & 0 & 0 & 0 & 0 & \ldots & 0 \\ 0 & 0 & 0 & 0 & 0 & \ldots & 0 \\ \vdots & \vdots & \vdots & \vdots & \vdots & \vdots & \vdots \\ 0 & 0 & 0 & 0 & 0 & \ldots & 0 \end{bmatrix}. \quad (23)$$

By separating real and imaginary parts, equation (21) can be rewritten as $$\underbrace{\begin{bmatrix} \text{Re}(A+B) & -\text{Im}(A-B) \\ \text{Im}(A+B) & \text{Re}(A-B) \end{bmatrix}}_{Q(d)} \begin{bmatrix} \text{Re}(c) \\ \text{Im}(c) \end{bmatrix} = \begin{bmatrix} \zeta \\ 0 \end{bmatrix} \quad (24)$$

In general, for motors with more than two phases (i.e. p>2), there are fewer equations than unknowns in (24). Therefore, a unique solution is not expected. The pseudo-inverse offers the minimum-norm solution, i.e. minimum $\|c\|$, which is consistent with the minimum power losses. Thus $$c = [I_N \quad jI_N] Q^+ \begin{bmatrix} \zeta \\ 0 \end{bmatrix}, \quad (25)$$

where $Q^+$ represents the pseudo-inverse of matrix Q and $I_N$ is the N×N identity matrix.

Having explained the theory relating to modeling and control of motor torque in terms of Fourier series, the following explains how the commutation law is modified at high velocity, according to the present invention, for ripple compensation and derivation of the torque transfer function taking into account the dynamics of the driver/amplifier 140.

First, with respect to ripple compensation, since motor phase currents are determined based on sinusoidal functions of the motor angle, high motor velocities result in a high drive frequency that makes it difficult for the commutator 130 to track the reference current input. Therefore, design of ripple-free commutation at high velocities necessitates taking the dynamics of the driver/amplifier 140 into account.

In practice, the range of motor velocities in which torque-ripple compensation (without velocity compensation) becomes problematic depends on three factors: i) bandwidth (BW) of the driver/amplifier (in rad/s); ii) the number of motor poles q; and iii) the maximum harmonics of the motor back-emf waveform n. Specifically, the motor velocity ω (in rpm) should be less than (30*BW)/(pi*q*n). For example, for BW=100 rad/s, q=2, and n=10, velocity induced torque ripple becomes problematic at 47.8 rpm and higher. With h(t) defined as the impulse response of the driver/amplifier 140, the actual and dictated phase currents are no longer identical, rather they are related by $$i_k(t) = \int_0^t i_k^*(\zeta) h(t-\zeta) d\zeta \quad \forall k = 1, \ldots, p. \quad (26)$$

After substituting (5) and (1) into (26), the total motor torque can be expressed as $$\tau(\tau_d, \theta) = \sum_{k=1}^{P} \left( \sum_{m=-N}^{N} d_m e^{jm\left(q\theta(t) + 2\pi\frac{k-1}{p}\right)} \right) \times \quad (27)$$

$$\int_0^t \tau_d(\zeta) \sum_{n=-N}^{N} c_n e^{jn\left(q\theta(\zeta) + 2\pi\frac{k-1}{p}\right)} h(t-\zeta) d\zeta$$

$$= p \sum_{\substack{n=-N \\ n \neq 0}}^{N} \sum_{l=(n-N)/p}^{(n+N)/p} c_n d_{pl-n} e^{jpl\theta} \times \left( \int_0^t \tau_d(\zeta) e^{-jq\omega n(t-\zeta)} h(t-\zeta) d\zeta \right)$$

Equation (27) is obtained by using (11) and assuming a constant velocity, i.e., $\theta(t) - \theta(\zeta) = \omega(t-\zeta)$. The integral term in the right-hand-side of (27) can be written as the convolution integral, $\tau_d(t) * e^{-jq\omega nt} h(t)$, where function $e^{-jq\omega nt} h(t)$ can be interpreted as the impulse response of a virtual system associated with the nth harmonics. Then, the corresponding steady-state response to the step torque input response is given by $\tau_d H(jq\omega n)$, where H(s) is the Laplace transform of function of h(t), i.e., the amplifier's transfer functions. Now, define coefficients $$c'_n = c_n H(jqn\omega) \; \forall n = 1, \ldots, N \quad (28)$$

and the corresponding vector $c'=\text{col}(c'_1, \ldots, c'_N)$ is related to vector c by $$c'=D(\omega)c \quad (29)$$

where $$D(\omega)=\text{diag}(H(j q\omega), H(j2q\omega), \ldots, H(jNq\omega)).$$

A person of skill in the art will understand that the angular velocity variable $\omega$ in (28) and (29) should not be confused with the frequency. Since $H(-jqn\omega)=\overline{H(jqn\omega)}$, the new coefficients satisfy $$c'_{-n}=\overline{c'_n} \; \forall n=1,\ldots,N$$

Therefore, c' are the compensated Fourier coefficients of a commutation law that in the presence of actuator dynamics yields the same steady-state torque profile as the commutation law set forth above. This means that all commutations that yield ripple-free torques at constant velocity $\omega$ must satisfy the constraint equation (21) with c being replaced by c'. Therefore, the Fourier coefficients of the commutation law that at rotor velocity $\omega$ yields ripple-free torque must satisfy:

$$AD(\omega)c+BD(\omega)\overline{c}-\zeta=0,$$

or equivalently $$Ac'+B\overline{c'}-\zeta=0. \quad (30)$$

Furthermore, as discussed below, power dissipation in the presence of amplifier dynamics is proportional to $\|c'\|^2$. Taking into account the relationship between actual and dictated phase currents set forth in (26), the average power dissipation is $$P_{loss} \propto \sum_{k=1}^{p} \lim_{T\to\infty} \frac{1}{T} \int_0^T \left( \int_0^t \sum_{n=-N}^{N} c_n e^{jq\omega n\xi} h(t-\xi) d\xi \right)^2 dt \quad (31)$$

$$= \lim_{T\to\infty} \frac{p}{T} \int_0^T \left( c_n e^{jqn\omega t} \int_0^t e^{-jqn\omega v} h(v) dv \right)^2 dt$$

$$= \lim_{T\to\infty} \frac{p}{T} \int_0^T (c'_n e^{jqn\omega t})^2 dt$$

It follows from (18)-(19), above, that $$P_{loss} \propto p\|c'\|^2 \quad (32)$$

Therefore, in view of (30) and (32), one can conclude that the problem of finding a coefficient c' that minimizes power dissipation and yields ripple-free torque at particular motor velocity $\omega$ can be similarly formulated as set forth in (20) if c is replace by c'. Having determined c', the spectrum of actual commutation, c, can be obtained from the linear relationship set forth in (29) through matrix inversion.

Next, in order to derive the torque transfer function in view of amplifier dynamics, the position independent part of the generated torque is $$\tau_{lin}(\tau_d) = p \sum_{\substack{n=-N \\ n \neq 0}}^{N} \overline{c}_n d_n \int_0^t \tau_d(\zeta) e^{-jq\omega n(t-\zeta)} h(t-\zeta) d\zeta \quad (33)$$

$$= g(t) * \tau_d(t)$$

where * denotes the convolution integral and g(t) is the impulse function of the system, $$g(t) = 2p \sum_{n=1}^{N} |a_n|\cos(q\omega nt + \angle a_n)h(t), \quad (34)$$

with $a_n=c_n\overline{d}_n$.

Transforming function (34) into the Laplace domain, the system torque transfer function becomes $$G(s) = p \sum_{n=1}^{N} a_n H(s+jqn\omega) + \overline{a}_n H(s-jqn\omega)), \quad (35)$$

where $$G(s) = \frac{\tau_{lin}(s)}{\tau_d(s)}.$$

Returning to the BLDC motor 100 of FIG. 1, the Fourier coefficients of the commutation law may be calculated experimentally as a function of the desired velocity, according to the method set forth above. First, assume that the three-phase motor has two poles and drives mechanical load 160 (including the rotor 110) with inertia 0.05 kgm$^2$ and viscous friction 4 Nm.s/rad, and that the load is driven by commutator 130 under control of a Proportional Integral (PI) controller 150 within a velocity feedback loop, where the controller gains are set to $$K_p=1.1 \text{ Nm.s/rad and } K_i=18 \text{ Nm/rad},$$

so that the controller 150 achieves a well-damped behavior. A time varying desired velocity $\omega_d$ is input to the controller 150, which changes from 2 rad/s to 20 rad/s and then to 10 rad/s in three 2-second intervals. The relatively low bandwidth driver/amplifier 140 is characterized by the following transfer function $$H(s) = \frac{60}{s+60}$$

Figure 2:
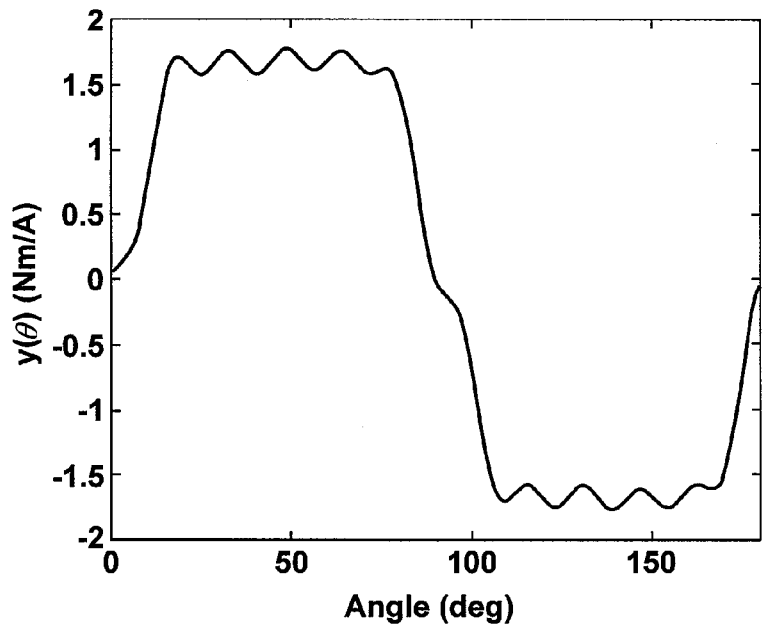
FIG. 2 is a graph showing the motor phase waveform for the brushless DC motor in FIG. 1.

The motor torque-angle profile (motor phase waveform) is shown in FIG. 2, and the corresponding complex Fourier coefficients, are listed in Table 1, which shows simulation results for the commutator 130 operating according to the conventional commutation law and according to the modified commutation law of the present invention, in terms of harmonic content of the torque shape function and the commutation shape functions:

TABLE 1

(Fourier Coefficients)

| Harmonics | Torque Function | Conventional Commutation | Modified Commutation |
|---|---|---|---|
| 1 | −0.0678 − 0.9977i | −0.0105 − 0.1603i | 0.0964 − 0.1673i |
| 3 | −0.0405 − 0.2107i | −0.0051 − 0.0305i | 0.0558 − 0.0407i |
| 5 | −0.0063 − 0.0216i | 0.0055 + 0.0098i | −0.0272 + 0.0283i |
| 7 | 0.0300 + 0.0315i | −0.0026 − 0.0062i | 0.0261 − 0.0182i |
| 9 | 0.0365 + 0.0288i | 0.0017 + 0.0018i | −0.0093 + 0.0123i |
| 11 | 0.0602 + 0.0173i | −0.0025 + 0.0012i | −0.0113 − 0.0174i |
| 13 | −0.0137 + 0.0104i | 0.0102 + 0.0018i | −0.0056 + 0.0902i |
| 15 | 0.0073 + 0.0027i | 0.0030 + 0.0001i | 0.0021 + 0.0297i |
| 17 | −0.0019 + 0.0017i | −0.0031 − 0.0000i | −0.0027 − 0.0347i |
| 19 | −0.0039 + 0.0019i | −0.0013 − 0.0003i | 0.0030 − 0.0169i |
| 21 | −0.0005 − 0.0011i | 0.0006 + 0.0011i | −0.0142 + 0.0096i |
| 23 | −0.0017 − 0.0009i | 0.0004 − 0.0006i | 0.0099 + 0.0061i |

Figure 3:
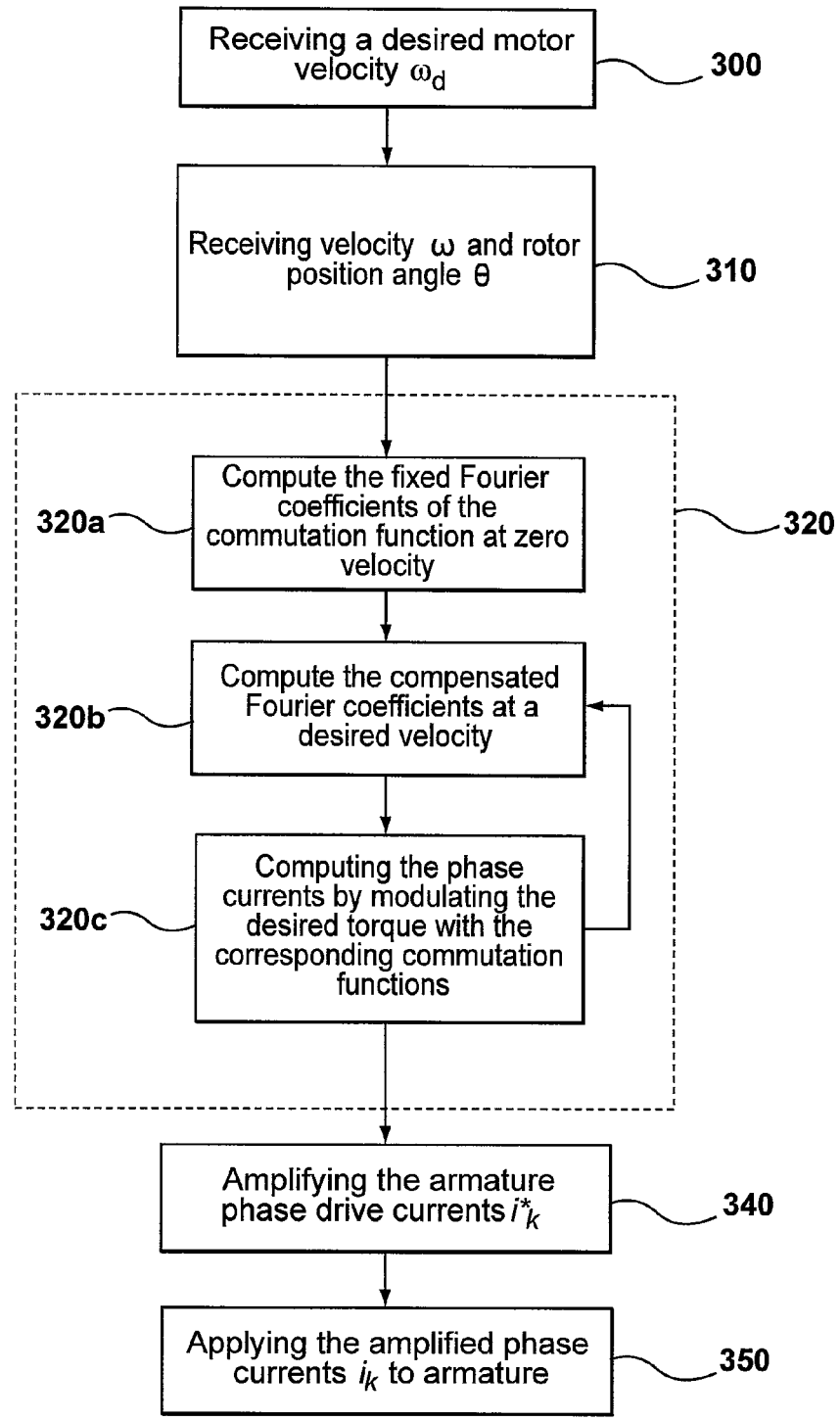
FIG. 3 is a flowchart showing a method for ripple suppression in brushless DC motors having limited drive/amplifier bandwidth when operated at high velocity, according to a preferred embodiment.

Based on the detailed discussion and experimental results set forth above, the method according an aspect of the present invention for generating a ripple-free desired torque $\tau_d$ to a load (i.e. combination of rotor 110 and mechanical load 160), is shown in the flowchart of FIG. 3, and comprises receiving a desired motor velocity $\omega_d$ (step 300), receiving the actual velocity $\omega$ and rotor position angle $\theta$ from the mechanical load 160 (step 310), generating armature phase drive currents $i^*_k$, from the desired motor velocity $\omega_d$, actual velocity $\omega$ and rotor position angle $\theta$ using a modified commutation law (step 320), amplifying the armature phase drive currents via driver/amplifier 140 (step 340) and applying the resulting currents $i_k$ to armature 120 (step 350) for rotating the rotor 110 and load 160, wherein the modified commutation law (step 320) comprises computing the fixed Fourier coefficients of the commutation function at zero velocity according to equation (25)

$$c' = [\,I_N \quad jI_N\,]Q^+ \begin{bmatrix} s \\ 0 \end{bmatrix},$$

(step 320*a*); computing the compensated Fourier coefficients at any desired velocity according to equation (29) $c=D^{-1}(\omega)c'$ (step 320*b*); computing the phase currents by modulating the desired torque with the corresponding commutation functions according to equations (5) and (6) $i^*_k(\tau_d,\theta)=\tau_d\, u_k(\theta)$, $\forall k=1, \ldots, p$ and $$u(\theta) = \sum_{n=-N}^{N} c_n e^{jnq\theta},$$

(step 320*c*); and returning to step 320*b*.

The spectrums of (i) the conventional commutation scheme (i.e. without taking the frequency response of the amplifiers into account) based on the fixed Fourier coefficients of equation (25) ii) the modified commutation scheme based on velocity dependent Fourier coefficients (29), for $\omega_d=20$ rad/s, are given in the third and fourth columns of Table 1, respectively.

Figure 4:
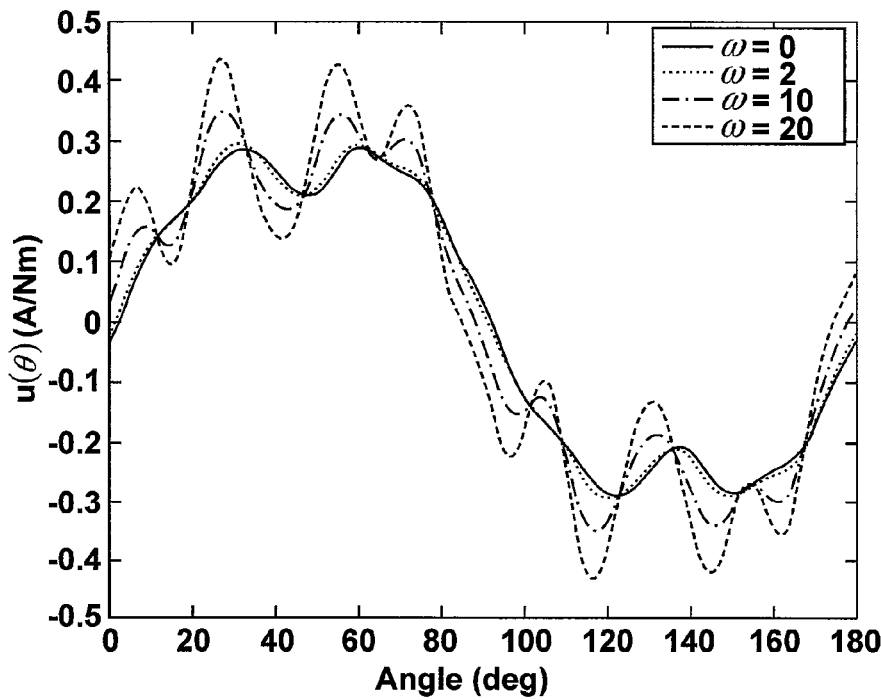
FIG. 4 is graph showing waveforms of the commutation function corresponding to different rotor velocities for the brushless DC motor in FIG. 1.

The waveforms of the commutator corresponding to various rotor velocities for one cycle are illustrated in FIG. 4.

Figure 5A:
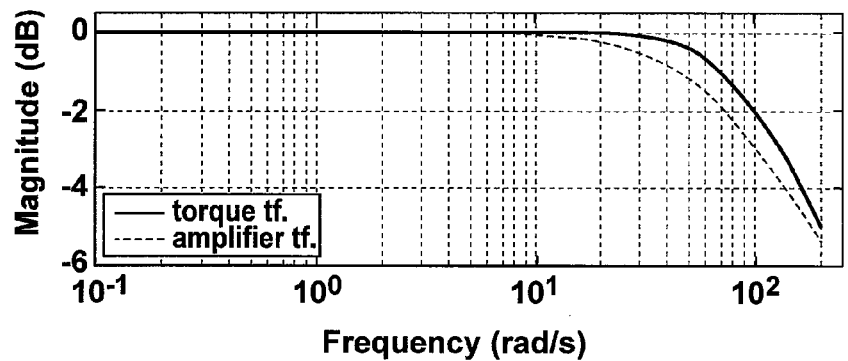
FIGS. 5A and 5B are bode plots of the driver/amplifier and the torque transfer function for the brushless DC motor in FIG. 1.
Figure 5B:
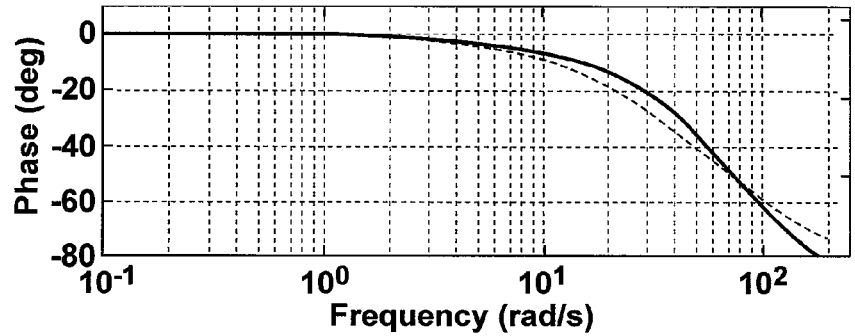
Figure 6A:
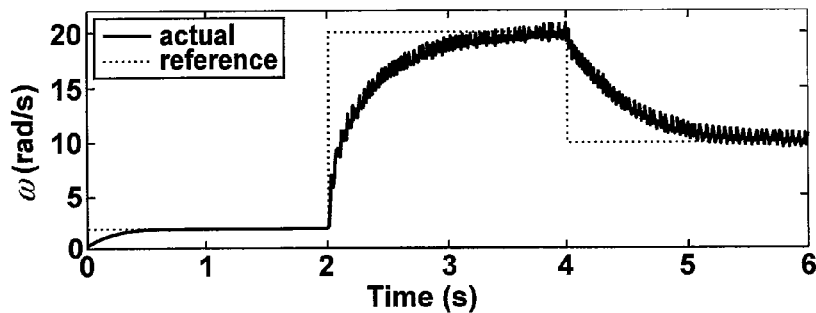
FIGS. 6A and 6B are step response curves for the closed-loop PI (proportional-integral) velocity controller of FIG. 1.
Figure 6B:
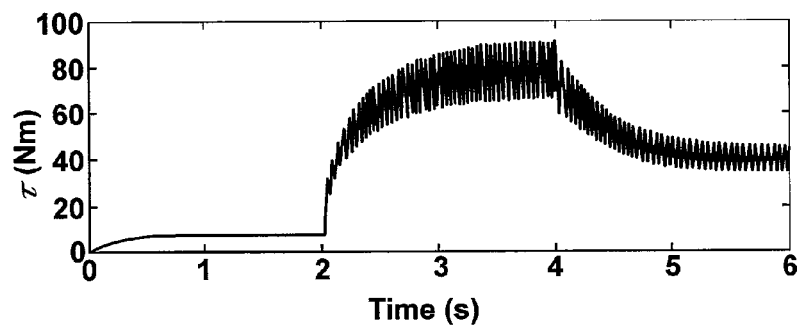
Figure 7A:
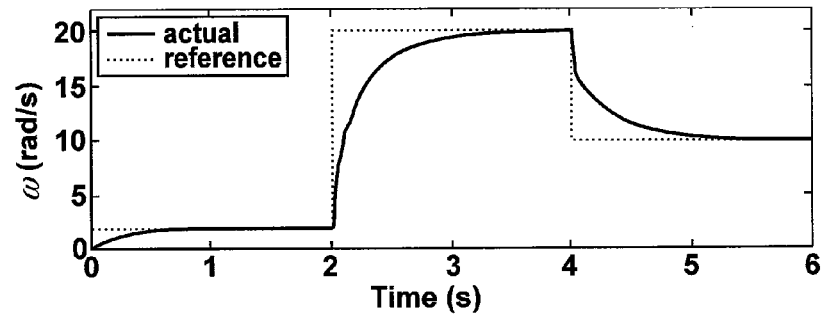
FIGS. 7A and 7B are step response curves of a velocity controller for a conventional commutation system.
Figure 7B:
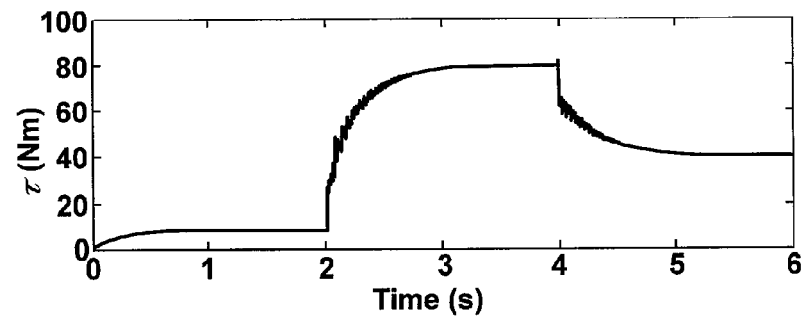

The bode plots of the torque transfer function obtained from (35) along with the amplifier transfer function are illustrated in FIG. 5.

Trajectories of the motor torque and velocity obtained from the step-input response of the closed-loop system with the conventional and modified commutation functions are illustrated in FIGS. 6A, 6B and 7A, 7B, respectively.

It is apparent from the foregoing that the conventional commutation law is able to eliminate pulsation torque only at low velocity whereas the modified commutation method according to the present invention does so for any velocity.

In conclusion, an apparatus and method are set forth for electronically controlled commutation based on Fourier coefficients for BLDC motors operating at high velocity while the driver/amplifier bandwidth is limited. As discussed above, the excitation currents are preshaped based on not only rotor angle but also velocity in such a way that the motor always generates the requested (desired) torque while minimizing power losses. Unlike prior art commutation schemes, perfect ripple cancellation is effected at every velocity making the commutation method of the present invention particularly suitable for velocity servomotor systems, (e.g., flywheel of a spacecraft). The simulations set forth above demonstrate that the performance of a velocity servomotor system is compromised by velocity if the conventional prior art commutation scheme is used whereas the commutation scheme according to the present invention significantly reduces torque ripple and velocity fluctuation.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of driving a load via a brushless DC motor, comprising:
   receiving a desired motor velocity $\omega_d$;
   receiving actual velocity $\omega$ and rotor position angle $\theta$ from said load;
   generating armature phase drive currents $i^*_k$, for a desired torque $\tau_d$ from the desired motor velocity $\omega_d$, actual velocity $\omega$ and rotor position angle $\theta$ using a modified commutation law;
   amplifying the armature phase drive currents via a driver/amplifier; and
   applying the amplified armature phase drive currents $i_k$ to an armature of said brushless DC motor for inducing rotation of said rotor and thereby rotating said load;
   wherein the modified commutation law comprises calculating compensated Fourier coefficients c' of a truncated (finite) Fourier series approximating the armature phase drive currents for said desired motor velocity $\omega_d$ as a function of the actual velocity $\omega$ and transfer function of said driver/amplifier, wherein said modified commutation law further comprises:
   a) computing fixed Fourier coefficients c of said Fourier series at zero velocity;
   b) computing said compensated Fourier coefficients c' at said desired motor velocity $\omega_d$;
   c) computing the armature phrase drive currents i*k by modulating the desired torque $\tau_d$ with said corresponding commutation functions $u_k(\theta)$ according to $i^*_k(\tau_d,\theta)=\tau_d\, u_k(\theta)$, $\forall k=1, \ldots, p$ and $$u(\theta) = \sum_{n=-N}^{N} c_n e^{jnq\theta};$$

and
   d) returning to b).

2. The method of claim 1, wherein said fixed Fourier coefficients c are computed according to $$c' = [\,I_N \quad jI_N\,]Q^+ \begin{bmatrix} s \\ 0 \end{bmatrix}.$$

3. The method of claim 1, wherein said compensated Fourier coefficients c' are computed according to $c=D^{-1}(\omega)c'$.

4. The method of claim 1, wherein said armature phase drive currents $i^*_k$, are computed by modulating the desired torque $\tau_d$ with said corresponding commutation functions $u_k(\theta)$ according to $i^*_k(\tau_d,\theta)=\tau_d u_k(\theta)$, $\forall k=1,\ldots,p$ and $$u(\theta) = \sum_{n=-N}^{N} c_n e^{jnq\theta}.$$

5. A controller for controlling rotation of a load by a brushless DC motor having a stator and a rotor, comprising:
 a motion controller for receiving a desired motor velocity $\omega_d$, actual velocity $\omega$ and rotor position angle $\theta$ from said load;
 a commutator for generating armature phase drive currents $i^*_k$, for a desired torque $\tau_d$ from the desired motor velocity $\omega_d$, actual velocity $\omega$ and rotor position angle $\theta$;
 a driver/amplifier for amplifying the armature phase drive currents and applying the amplified armature phase drive currents $i_k$ to an armature of said stator for inducing rotation of said rotor and thereby rotating said load;
 wherein said motion controller and commutator generate said armature phase drive currents $i^*_k$ according to a modified commutation law comprising calculating compensated Fourier coefficients c' of a truncated (finite) Fourier series approximating the armature phase drive currents for said desired motor velocity $\omega_d$ as a function of the actual velocity $\omega$ and transfer function of said driver/amplifier, wherein said modified commutation law further comprises:
 a) computing fixed Fourier coefficients c of said Fourier series at zero velocity;
 b) computing said compensated Fourier coefficients c' at said desired motor velocity $\omega_d$;
 c) computing the armature phrase drive currents i*k by modulating the desired torque $\tau_d$ with said corresponding commutation functions $u_k(\theta)$ according to i*hd k($\tau_d$, $\theta$)=$\tau_d u_k(\theta)$, $\forall k=1,\ldots,p$ and $$u(\theta) = \sum_{n=-N}^{N} c_n e^{jnq\theta};$$

and
 d) returning to b).

6. The apparatus of claim 5, wherein said fixed Fourier coefficients c are computed according to $$c' = [I_N \quad jI_N]Q^+ \begin{bmatrix} s \\ 0 \end{bmatrix}.$$

7. The apparatus of claim 5, wherein said compensated Fourier coefficients c' are computed according to $c=D^{-1}(\omega)c'$.

8. A brushless DC motor, comprising:
 a rotor for rotating a mechanical load;
 a stator having armature coils;
 controller for receiving a desired motor velocity $\omega_d$, actual velocity $\omega$ and rotor position angle $\theta$ from said load;
 a commutator for generating armature phase drive currents $i^*_k$, for a desired torque $\tau_d$ from the desired motor velocity $\omega_d$, actual velocity $\omega$ and rotor position angle $\theta$;
 a driver/amplifier for amplifying the armature phase drive currents and applying the amplified armature phase drive currents $i_k$ to the armature coils of said stator for inducing rotation of said rotor and thereby rotating said load;
 wherein said controller and commutator generate said armature phase drive currents $i^*_k$ according to a modified commutation law comprising calculating compensated Fourier coefficients c' of a truncated (finite) Fourier series approximating the armature phase drive currents for said desired motor velocity $\omega_d$ as a function of the actual velocity w and transfer function of said driver/amplifier, wherein said modified commutation law further comprises:
 a) computing fixed Fourier coefficients c of said Fourier series at zero velocity;
 b) computing said compensated Fourier coefficients c' at said desired motor velocity $\omega_d$;
 c) computing the armature phrase drive currents i*k by modulating the desired torque $\tau_d$ with said corresponding commutation functions $u_k(\theta)$ according to $i^*_{k(\tau_d,\theta)}=\tau_k(\theta)$, $\forall k=1,\ldots,p$ and $$u(\theta) = \sum_{n=-N}^{N} c_n e^{jnq\theta};$$

and
 d) returning to b).

9. The brushless DC motor of claim 8, wherein said fixed Fourier coefficients c are computed according to $$c' = [I_N \quad jI_N]Q^+ \begin{bmatrix} s \\ 0 \end{bmatrix}.$$

10. The brushless DC motor of claim 8, wherein said compensated Fourier coefficients c' are computed according to $c=D^{-1}(\omega)c'$.

* * * * *

UNITED STATES PATENT AND TRADEMARK OFFICE
CERTIFICATE OF CORRECTION

PATENT NO. : 8,766,578 B2  
APPLICATION NO. : 13/405575  
DATED : July 1, 2014  
INVENTOR(S) : Farhad Aghili Page 1 of 1

It is certified that error appears in the above-identified patent and that said Letters Patent is hereby corrected as shown below:

In the Claims:

Column 14, line 43, "i*k" should be changed to --i*_k--, where _ denotes a subscript.
Column 14, line 57, "c" should be changed to --c'--.
Column 15, line 29, "c" should be changed to --c'--.
Column 15, line 31, "c'" should be changed to --c--.
Column 15, line 33, "i*k" should be changed to --i*_k--, where _ denotes a subscript.
Column 15, line 34, "i*hd k" should be changed to --i*_k--, where _ denotes a subscript.
Column 16, line 29, "i*_k(τd" should be changed to --i*_k (τd--, where _ denotes a subscript.

Signed and Sealed this  
Ninth Day of December, 2014

Michelle K. Lee  
*Deputy Director of the United States Patent and Trademark Office*